July 16, 1968 W. D. ROGERS 3,392,498

SELF-LOCKING SEALING STRIP

Filed Sept. 20, 1965

INVENTOR
William D. Rogers
Frank J. Earnheart
BY James A. Lucas
ATTORNEYS

United States Patent Office 3,392,498
Patented July 16, 1968

3,392,498
SELF-LOCKING SEALING STRIP
William D. Rogers, Logansport, Ind., assignor to The General Tire & Rubber Company, a corporation of Ohio
Filed Sept. 20, 1965, Ser. No. 488,491
2 Claims. (Cl. 52—395)

ABSTRACT OF THE DISCLOSURE

A protective cover for pinch welds and the like is composed of a rigid body with a pair of parallel legs each having a terminal portion that is substantially thicker than the remainder thereof. Located in proximity to each terminal portion is a sponge rubber locking strip. The frictional contact between the locking strips and the adjacent surface of the pinch weld creates a wedging action in cooperation with the thickened terminal portion to resist efforts to remove the cover after installation.

---

In assembling the body of an automobile, the various components thereof are stamped out and formed into shape by suitable means, after which the components are assembled into an integral unit. These components can be connected to one another by bolts, screws, or the like; but a more common method of accomplishing this is to form flanges which are abutted against one another and are then welded together by suitable means such as spot welding, often referred to as pinch welding. The spot welded seam, or pinch weld, produces an unfinished edge which is unsightly and may also be rough and jagged. In the past it has been a common practice to conceal this seam with a suitable cover, called a fence cover, dressed up in such a manner as to be esthetically compatible with the finished parts of the automobile.

One object of this invention is to provide an improved cover for seams such as pinch weld joints, which cover can be easily snapped into place but which cannot be readily removed.

Another object is to provide a cover clip which can be readily assembled into place and which uses a pair of circular strips of sponge material to retain the clip in place.

Yet another object is to provide a finishing strip having a self-locking feature, said strip comprising a relative rigid body member and an elongated circular sponge rubber sealing strip mounted on either side of said body member and adapted to securely hold the strip on to the structural member with which the strip is used.

These and other objects will become apparent in light of the following description and figures in which.

Figure 1:
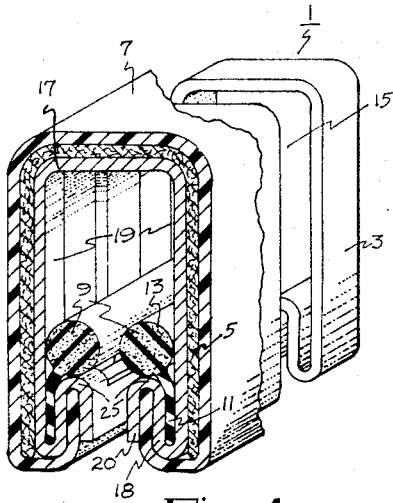
FIGURE 1 is a perspective view, partially cut away, of a sealing strip representing a preferred embodiment of the invention.

Referring now to the figures, there is shown in FIGURE 1 a longitudinally extending sealing strip 1 of generally channel shaped cross section. The strip consists of a rigid body or core 3, a layer of cushioning material 5, and an outer decorative cover 7 of, for example, supported vinyl plastic.

The body 3, preferably fabricated out of metal, has a crown 17 and two legs 19 extending perpendicular to the crown. The terminating edge of each leg is bent in the shape of an S, thereby forming two longitudinally extending strips 18, 20 parallel to said legs and joined to one another by a loop 25. The body 3 is typically provided with a plurality of slots 15 extending transversely from one leg across the crown to the other leg. These slots serve to increase the flexibility of the sealing strip, thereby permitting the strip to be deformably adapted to the contour of the pinch weld, butted flange, or the like. The flexibility can be varied by altering the number and size of said slots.

A longitudinally extending, preferably extruded, anchor strip 9 extends along each leg 19 of the body, each strip consisting of a planar base 11 and a generally circular gripping portion 13 composed of a material such as sponge rubber which has a high coefficient of friction. The base 11 of each anchor strip is securely clamped between one of the legs 19 and the strip 18 with the circular gripping portion 13 extending in the direction of the crown 17 of the body.

The exterior surface of the slotted body is preferably covered with a cushion material 5, such as foam or felt, over which is disposed a decorative cover 7. This cover serves to hold the cushion material in place and is itself securely clamped along each lateral edge between the strips 18, 20 of one of the legs 19.

Figure 2:
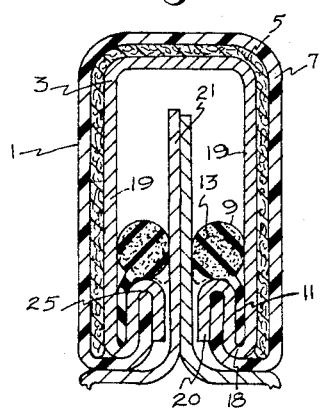
FIGURE 2 shows the sealing strip of FIGURE 1 assembled over a pinch weld seam.

In FIGURE 2 is seen a pinch weld cover of the type shown in FIGURE 1 mounted on a seam or pinch weld 21. To install the cover, a downward pressure is exerted on it permitting it to slip over the pinch weld. The pressure exerted by the edges of the metal pinch weld push the two circular gripping portions 13 away from one another, if necessary compressing them slightly against the legs 19 of the body 3. When an attempt is made to remove the cover by pulling it in a direction opposite to that used to install it, the frictional engagement between the surfaces of the pinch weld and the two gripping portions 13 urges these portions toward their respective bases 11, which themselves are securely held. This causes these circular portions 13 to roll toward one another and exert an inwardly directed pressure which tends to tightly grip the pinch weld. Furthermore, there is a tendency for these circular portions to wedge themselves in between the loop 25 and the pinch weld seam 21 (as shown in outline) thus serving to further resist the efforts to remove the strip from the pinch weld.

Figure 3:
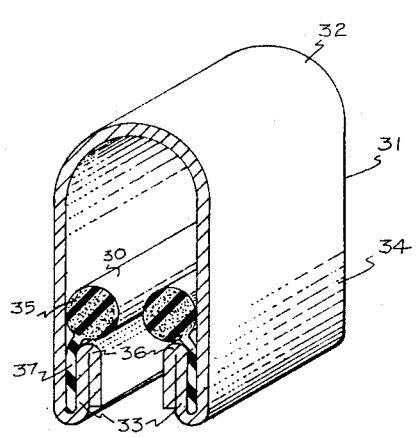
FIGURE 3 shows a simplified version, in perspective, of the sealing strip.

FIGURE 3 shows a simplified version of a fence cover, the principal deviation from that shown in FIGURES 1 and 2 being that the soft cushion layer, as well as the decorative cover layer, have been omitted. Basically, the fence cover comprises a generally U-shaped body 31 having a crown 32 and two legs 34. The edges of these legs are folded inwardly and up toward the crown 32 to form clamping strips 33 along the length of said body. The fence cover also includes a pair of anchor strips 30, each comprising a substantially planar base portion 37 and a generally circular gripping portion 35, the surface of which has a high coefficient of friction. The base portion 37 of each anchor strip is disposed between one leg 34 and its respective clamping strip 33 and is there held in place. Each clamping strip 33 is provided with a fold 36 which affords a smooth contacting surface for the circular portion 35 of the anchor strip 30. The body portion 31 of the fence cover is preferably fabricated out of metal; and if used for decorative purposes, is appropriately finished by chrome plating, painting, or the like. It may, however, be made from a rigid plastic material by molding, extrusion, or the like. In fact, any material may be used in constructing the body portion of the cover as long as it is inherently rigid and means are provided for attaching the anchor strips thereto. The rigidity should be sufficiently great to resist the force exerted by the structural member, such as a welded flange, against the anchor strips 30 when an attempt is made to remove the cover from the member. In operation, the sealing cover as shown in FIGURE 3 acts in the same manner as that shown in FIGURES 1 and 2, the self-locking action residing in the frictional co-action between the sponge sealing strips and the structural member held therebetween. The principal difference resides in the fact that the cover shown in FIGURE 3 does not have the degree of flexibility exhibited by one with a slotted body.

Figure 4:
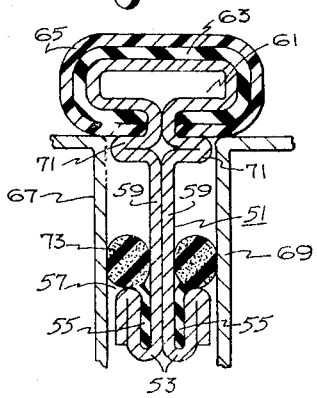
FIGURE 4 shows another sealing strip of the invention utilized as a spacer between two spaced-apart structural members.

FIGURE 4 shows a variation of the invention wherein the operative features of the circular sponge anchor strips are used in a spacer device adapted to be inserted between two spaced-apart flat structural surfaces.

In this embodiment, the spacer comprises a one-piece rigid body 51 of metal or the like, a pair of anchor strips 57 attached to said body, and a decorative cover over the exposed surface of the body. The body comprises two contiguous legs 59, the lower portion of which terminates in an S-shaped loop 53. A hollow loop 61 is formed at the upper end of the body, around which is wrapped a suitable cushion material 63 such as polyurethane foam covered with an appropriate decorative cover 65. The edges of the cushion material and the cover are securely held between folds 71 and the loop 61, said folds also serving to center the spacer between the two structural units 67 and 69.

The two anchor strips 57 are of the type heretofore described and comprise a planar base 55 and a generally circular structural engaging portion 73. The base 55 is clamped within one of the folds of loop 53 and is parallel and flush with its respective leg 59. The circular portion 73 extends upwardly from the base toward said fold 71.

When the spacer is assembled into the space between the parallel surfaces of two structural members 67 and 69, the circular portions 73 contact these parallel surfaces but offer no appreciable resistance to the assembly. However, when it is attempted to remove the spacer, the frictional characteristics of the circular portion 73 of each anchor strip will cause it to roll toward its base 55 and toward the structural surface thereby exerting a strong grip and wedging action against the structures and resisting further removal.

It is obvious that the spacer will not function properly if both gripping portions of the anchor strips do not contact their respective structural surfaces. Therefore, the combined diameters of these two circular portions and the legs 59 therebetween should be at least equal to, and preferably slightly greater than, the spacing between the two structural members. This assures that the surfaces of the structural members will contact the surfaces of the circular gripping portions. It should be understood, of course, that the filler strip or spacer can be flush mounted if desired and does not have to project above the surface of the structural members as shown in FIGURE 4. Such a filler strip can find use in many applications, such as in the erection or construction of prefabricated units such as walls, and the like.

Figure 5:
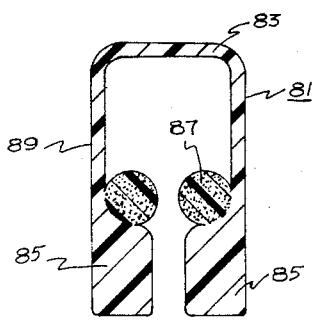
FIGURE 5 shows a one-piece sealing strip similar in cross section and operation to the strips shown in FIGURES 1, 2, and 3.

FIGURE 5 shows another embodiment of the invention wherein the self-clamping cover 81 is of one-piece construction. This cover consists of a generally U-shaped body portion 83 of substantially uniform thickness and has two copending legs 89, each terminating in a relatively thick edge 85. Forming an integral part of each edge 85 is a generally circular anchor portion 87. This cover 81 is preferably produced by a process referred to as dual durometer extrusion, wherein the body and edges are produced from a relatively high durometer, rigid elastomer, a polymer, and the sealing portion is made from a sponge type elastomer or polymer and has a surface with a high coefficient of friction. Generally, dual durometer extrusion involves the preparation of two masterbatches, one of which contains a suitable blowing agent. Each masterbatch is heated and is then extruded through a separate die into two separate extrusions which are then immediately united to form a unitary structure. The unitary extruded strip then passes through a heating operation wherein the temperature is sufficiently high to activate the foaming agent, thereby resulting in blowing of that portion of the extruded strip containing said agent. The result is a one-piece extrusion, part of which is composed of a relatively dense elastomer or polymer, and the other with a relatively porous closed-cell material.

A particularly suitable material for production of this one-piece cover is polyvinylchloride which can be extruded by the dual durometer process to form a relatively rigid body and a soft, pliable anchoring lip. Furthermore, this material can be produced in a wide variety of decorative colors, thus permitting this one-piece cover to be used in any of the applications heretofore mentioned, as well as a cover for exposed edges of appliances, cabinets, and the like.

The anchor strip of the type shown in FIGURES 1 through 4 is composed of a flat base and a generally circular anchor portion attached thereto. These two elements of the strip can be composed of the same material or can be different. They can be produced separately and then connected together during curing or by using a suitable adhesive, or they can be produced as a unitary member by extrusion or the like. The aforementioned process of dual durometer extrusion is particularly applicable and can be used to produce a dense planar base and a closed-cell sponge anchor portion. Utilizing this process, elastomers such as neoprene and natural rubber, both of which can be easily foamed into a closed cell structure having a surface with a high coefficient of friction, can be used. Furthermore, other elastomers and polymers can likewise be used so long as they possess the requisite properties and characteristics or can be treated so as to have those properties.

Keeping in mind the novel aspects of this invention wherein a pair of generally circular elastomeric anchoring members are used to hold a fence cover or spacer in place, there are various modifications which are readily apparent as being within the scope of the invention. For example, it is not essential that the anchor strips be clamped as shown in the drawings. Instead, they may be adhesively attached, screwed, riveted, or otherwise attached to the legs of the core. Furthermore, the legs of the fence cover or the spacer do not have to be parallel to one another, but can be deformed or bent to provide the proper spacing between the circular anchor portions. In addition, it may be found desirable to have two or more of these anchor portions attached to each leg to provide additional gripping. Also, certain applications may call for the channel strip to abut and/or seal against another member, such as a door jamb, in which case auxiliary lips, tubular sections, or the like may be provided along the outer surface of said cover. It is obvious that the channel shaped cover can be used over any exposed edge as a protective and/or decorative covering, its use not being limited to welded seams and the like.

Although the invention has been described by reference to a few specific embodiments thereof, it should be understood and appreciated that many other modifications and alterations can be made without deviating from the novelty which therein resides, which novelty is restricted only by the scope of the claims in which I claim:

1. An elongated generally channel shaped self-locking pinch weld cover comprising a rigid transversely slotted metallic core strip having a crown and two depending, substantially parallel legs, each of said legs terminating in an inwardly directed, substantially S-shaped configuration to form two folds, an elastomeric sealing strip having a substantially planar base and a generally circular elastomeric sponge sealing portion, said base secured in one of said folds and said sealing portion extending from said base toward said crown, a decorative covering forming the exterior of said metal core strip, the ends of said covering clamped in the second of said folds.

2. In combination with a generally planar structural member having an edge, an elongated generally channel shaped self-locking cover for said edge comprising a rigid metallic core member having a crown and two depending, substantially parallel legs, said core member being transversely slotted to increase the flexibility thereof, each parallel leg terminating in a substantially S-shaped configuration to define a first portion parallel to and inwardly of said leg and joined thereto by a first loop, and a second portion parallel to and joined with said first portion by a second loop, an elastomeric sealing strip having a substantially planar base and a generally circular elastomeric sponge sealing portion, the base of said sealing strip clamped between said leg and said first parallel portion and the circular sealing portion extending from said base toward said crown and into contacting relationship with said structural member, the thickness of each circular sealing portion being appreciably greater than the space between said structural member and the corresponding second portion of said leg to thereby cause wedging of said sponge sealing portions between said structural member and said second loop upon application of a force to remove said self-locking cover from said structural member.

References Cited

UNITED STATES PATENTS

| | | | |
|---|---|---|---|
| 3,068,136 | 12/1962 | Reid | 49—440 |
| 1,680,315 | 8/1928 | Bailey | 49—441 X |
| 1,903,541 | 4/1933 | Bailey | 49—440 |
| 1,908,864 | 5/1933 | Reid | 49—441 X |
| 3,230,677 | 1/1966 | Brown | 52—400 |

FOREIGN PATENTS 634,055  1/1950  Great Britain.

JOHN E. MURTAGH, *Primary Examiner.*

FRANK L. ABBOTT, *Examiner.*